Figure 1:
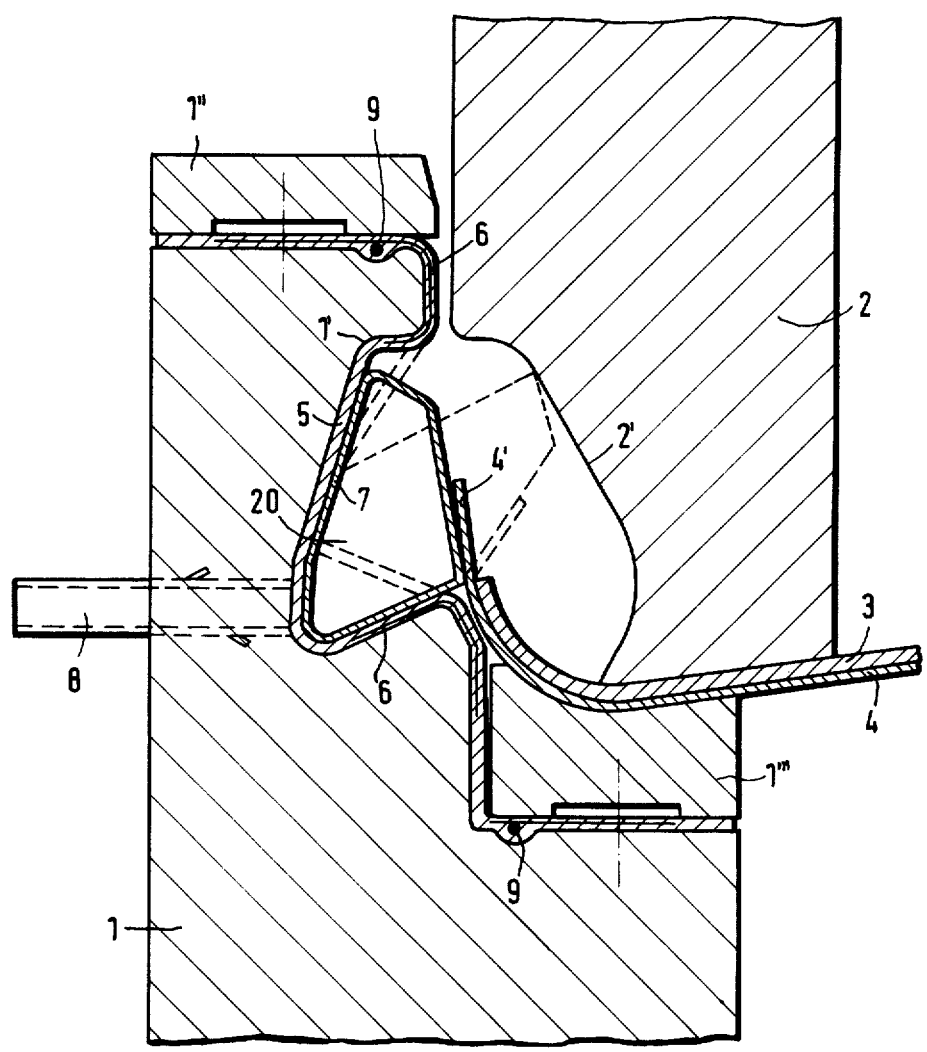

United States Patent [19]

Kiss

[11] 4,441,956
[45] Apr. 10, 1984

[54] APPARATUS FOR TUCKING THE EDGE ZONE OF A SURFACE COVERING OVER A SUPPORTING EDGE

[76] Inventor: Günter H. Kiss, Gustav-Freytag-Strasse 7, D-1000 Berlin 33, Fed. Rep. of Germany

[21] Appl. No.: 394,272

[22] Filed: Jul. 1, 1982

[30] Foreign Application Priority Data

Jul. 7, 1981 [DE] Fed. Rep. of Germany ....... 3127203

[51] Int. Cl.³ ............................................ B32B 31/00
[52] U.S. Cl. .................... 156/479; 156/216; 156/481; 156/493
[58] Field of Search ............... 156/401, 216, 478–481, 156/475, 493

[56] References Cited

U.S. PATENT DOCUMENTS

| | | |
|---|---|---|
| 2,717,628 | 9/1955 | Wikle et al. .......................... 156/401 |
| 3,146,156 | 8/1964 | Goldstone ......................... 156/216 X |
| 3,486,958 | 12/1969 | Waldock et al. ................. 156/401 X |

FOREIGN PATENT DOCUMENTS 541937 6/1957 Canada .................. 156/479 X

*Primary Examiner*—David A. Simmons
*Attorney, Agent, or Firm*—Lee C. Robinson, Jr.

[57] ABSTRACT

An apparatus is disclosed for tucking in and glueing over the edge zones of a supporting material to be provided on one side with a surface covering. The supporting material comprises mouldings which are usually of a fairly complicated spatial design, and the apparatus is so designed as to imitate as true to nature as possible the manual method of tucking in and glueing over the covering overlap around the edge of the moulding by the thumb and other parts of the human hand, which has hitherto given the best results. Members to be moved for this purpose are moved in the form of a turn-over membrane into and out of the tucking-in zone, and transversely moved fold-over members are merely hinged around the moulding edge, corresponding substantially to the movement of the front joint of the thumb when tucking in a covering.

16 Claims, 4 Drawing Figures

APPARATUS FOR TUCKING THE EDGE ZONE OF A SURFACE COVERING OVER A SUPPORTING EDGE

The invention relates to apparatus for tucking the edge zone of a surface covering over a supporting edge.

The tucking in of book bindings, wherein cardboard is covered on one side with a surface covering of linen, leather or other materials, is prior art as old as bookbinding itself. A number of automated processes have been developed for this purpose which raise no great problems technically, since the supporting material to be tucked in has precisely straight edge lines and is also flat.

In the case of three-dimensional mouldings, it is substantially more difficult to tuck in and glue over their edge zones when the mouldings are to be provided on one side with a surface covering, more particularly when relatively sharp angles in the spatial shape are also accompanied by unsteady outlines of the peripheral edges. This is the case, for example, in the manufacture of inner linings for the motor vehicle industry, as in the surface covering of private motor car door side parts or dashboards which must be covered with the most various materials, such as decorative sheets of plastics and/or metal, imitation leather, foamed plastics, tufted cloths, carpeting or textile fabrics, and many other materials.

Despite a considerable number of attempts at automation, in the past the manual tucking in and glueing over of the edge zones of fairly complicated mouldings of the kind in question was qualitatively the best solution; however, it is no longer justifiable, due to the extremely large amount of labour needed and the inescapable automation of the manufacture of such mouldings, with a substantially increased number of operations.

It is known to have the work of tucking in and glueing over the overlaps of the covering performed by machine; smooth or shaped rubber cloths are stretched over the moulding covered on one side and are then subjected to a vacuum which makes use of their elasticity to pull them far enough around the moulding edge to achieve the required tucking-in operation. Apparatus have also been proposed into which the moulding furnished with the surface covering is laid, and in which inflatable hollow sections, namely hoses, are subjected to pressure in the zone of the peripheral surface; they entrain the overlap of the covering and wrap the peripheral edge around the moulding. In other known attempts the covering is tucked in as required by contour-adapted and if necessary cushioned mechanical pushers.

However, the last-mentioned mechanized processes have considerable disadvantages since in the case of the already discussed edge contours of spatial mouldings, rich in curves and ridges, with their undercut zones, sharp corners and the like, manual re-working cannot be dispensed with, since in practice neither inflatable expanding hoses nor mechanical pushers ensure that the moulding edges are folded and glued over free from folds. When rubber cloths are used, they become so expanded, more particularly at the corners of the mouldings, that the cloths become unusable even after brief use—i.e., they must be frequently interchanged; however, due to the inadequate sucking over of the rubber cloths, the corners are tucked in so incompletely that large amounts of rejects must be expected. The situation is similar with expanding hoses. While during expansion they bear against shaping surfaces on their sides opposite the covering edge to be tucked in, the hoses are subjected to considerable frictional forces, resulting in areas of uneven expansion and similarly uneven and ill-defined glueing over of the edge; this applies more particularly to sharp corners in the peripheral line followed by the moulding, at which the hoses easily tend to kink. Technically it is also a very elaborate matter to glue over the edge zones by means of mechanical pushers in the case of moulding contours of a relatively complicated shape, since in that case a plurality of pushers must be used corresponding to a plurality of edge portions, and this not only makes the apparatus very unreliable, but also calls for considerable readjustment when changing over from one kind of moulding to another.

The present invention relates to the problem of providing an apparatus which, with the least possible technical elaboration, automatically enables the edge zones of a moulding to be provided on one side with a surface covering to be tucked in and glued over, even in the case of relatively complicated spatial shapes and peripheral edges with a large number of changes, while achieving a quality which was hitherto possible only as a result of costly manual labour.

All the aforementioned disadvantages are reliably obviated, since the tucking-in operation of the invention is performed exclusively by a turn-over membrane movably retained in the direction of the overlap of the covering to be tucked in. Independently of the line followed by the peripheral edge of a moulding, the turn-over membrane can follow its contour reliably, without the risk of excessive local expansions, since the membrane is limited in a well-defined manner in its movement by the given contact surfaces and is guided in an equally well-defined manner. There are no longer any merely partly tucked-in or unglued places immediately at the edges, or bumps on the rearside of the moulding with the covered surface. Particularly advantageously the turn-over membrane is brought into operative connection with an additional fold-over member of adequate deformability and elasticity, which is pivoted by the movement of the turn-over membrane around the peripheral edge of the moulding, at the same time entraining the overlap of the covering and forcing it in its end position firmly against the rear side of the moulding. For the tilting movement, the contact surface of the annular space through which the turn-over membrane passes acts to some extent as an enveloping or unwinding surface for the turn-over membrane and the fold-over member. The pressure required for the glueing is produced steplessly by the pressure applied to the turn-over membrane in the annular space on the side lying opposite to the overlap of the covering. A high contact pressure is not critical either for the turn-over membrane or for a fold-over member co-operating therewith, since their course of movement limits deformation and/or expansion by the aforementioned contact surfaces and can be selected in the optimum manner by their shaping. The consequently obtainable uniformity of the contact pressure in the edge zone over the whole length of the moulding periphery can be further homogenized and therefore improved at bent places or similarly sharp corners by the provision at those places of additional bufferings in the form of foam rubber inserts or the like, which can be moved by cavities, which can be pressurized independently of the aforementioned annular space, in the direction of the edge to be glued over and can be deformed accordingly. The use of the aforementioned fold-over member inside the annular space, into which the overlap of the covering extends freely before tucking in, advantageously enables the use of a relatively thick-walled turn-over membrane, which can then stand up to the application of correspondingly high pressures, since due to the fold-over member, the turn-over membrane must not adapt itself directly to sharp edges of the moulding, and therefore the turn-over membrane itself remains substantially free from wear. For the satisfactory tucking-in and glueing-over of the overlap of the covering around the peripheral edge of the moulding, it may be advantageous to begin to apply pressure to the turn-over membrane, which can also form a multi-chamber system in the annular space, first of all at those places at which foldings of the overlap may mainly occur during the tucking-in, only then tucking in the remaining edge zones. After the overlap of the covering has been glued, the pressurized turn-over membrane can be returned in a very simple manner by negative pressure to its starting position, so that it is at the same time prepared for the following operation.

The course of the downward-rolling-like movement of the turn-over membrane can be advantageously influenced by the membrane having locally differentiated tensile and bending strengths, this being rendered possible in a very simple manner, for instance, by corresponding inhomogeneities in the wall thickness, but also by reinforcements, for example, fabric inserts.

Figure 2:
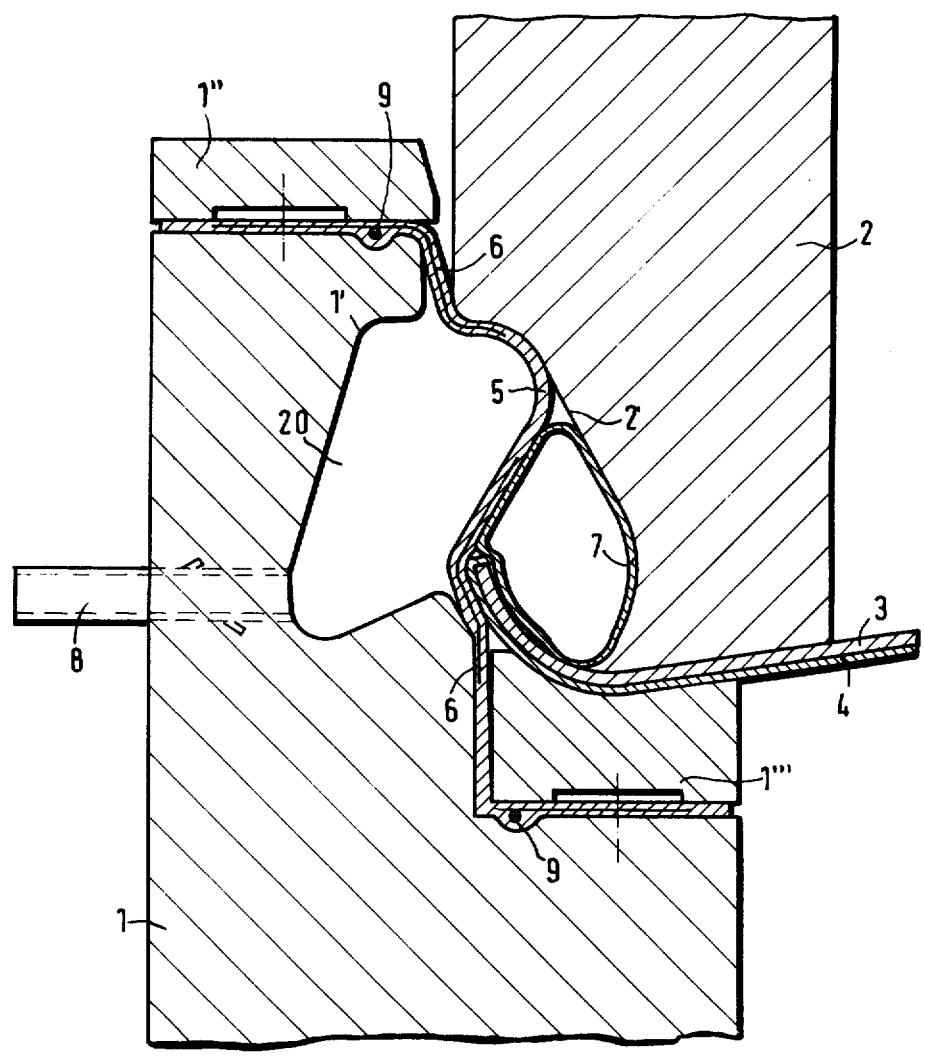
Figure 3:
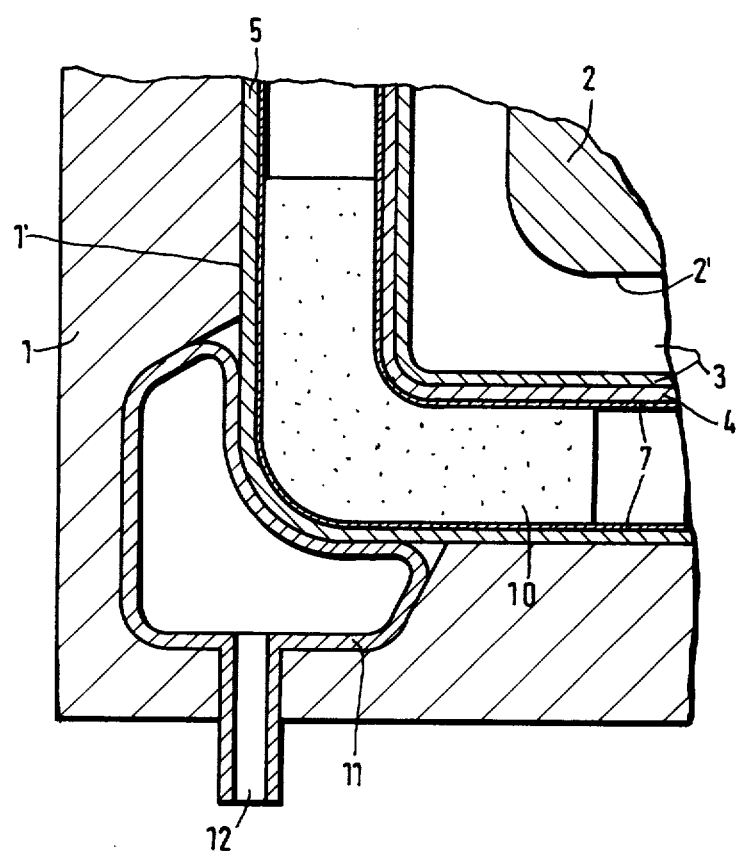
Figure 4:
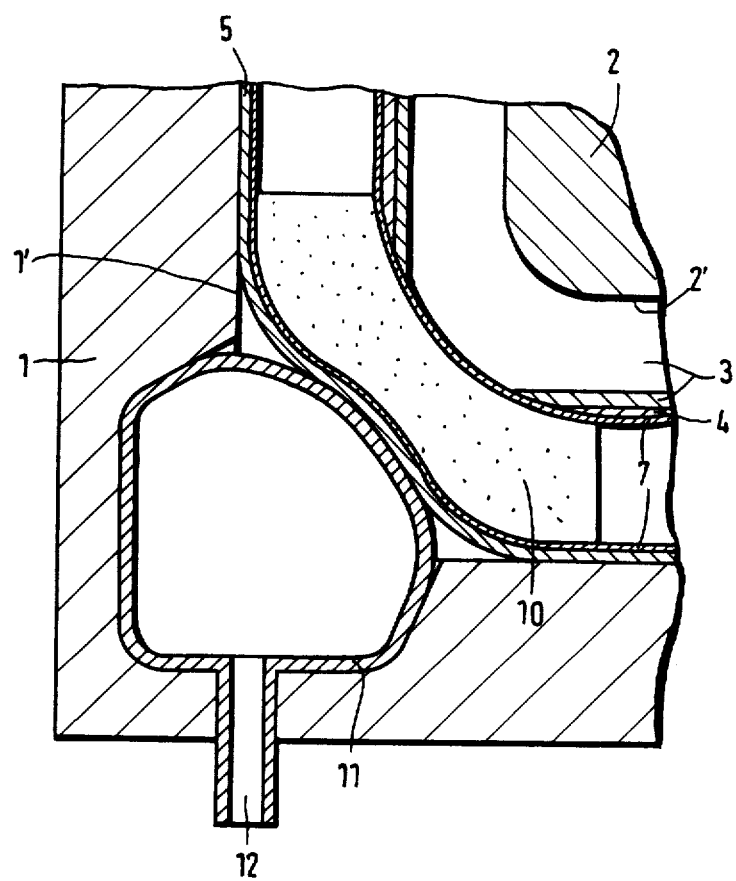

The accompanying drawings show a merely exemplary embodiment of the invention and serve to explain it in greater detail. In the drawings:

FIG. 1 is a cross-sectional through a portion of the top and bottom parts of the apparatus, including the annular space which receives the edge zone of a moulding, in the closed condition of the apparatus, before the tucking-in and glueing-over of the edge zone, FIG. 2 corresponds to FIG. 1, and shows the apparatus after the tucking-in and glueing-over of the edge zone, FIG. 3 is a longitudinal section through a portion of the apparatus illustrated in FIGS. 1 and 2, in a corner zone of a moulding, and FIG. 4 is an illustration corresponding to FIG. 3, after pressure has been applied to the additional hollow member provided in this zone.

As shown in FIGS. 1 and 2, the apparatus according to the invention comprises a lower part 1 and an upper part 2. In the assembled condition these parts receive between themselves a moulding 3 with a surface covering 4 on one side. The parts 1 and 2 enclose an annular space 20 (shown in cross-section) which extends around the whole peripheral edge of the moulding. The annular space 20 is defined by a contact surface 1' inside the lower part 1 and a further contact surface 2' which is made in the upper part 2. The two contact surfaces 1',2' are separated from one another by a turn-over membrane 5 which is attached to the lower part 1 in the manner illustrated by clamping members 1" and 1'". The clamping members 1" and 1'" are produced by an upper and a lower clamping ring and are rendered pressure-tight against their surroundings by each having a sealing element 9 in the form of a sealing ring.

In the embodiment illustrated, the turn-over membrane 5 retained between the clamping members has a free cross-sectional length which corresponds to the cross-sectional length of the contact surface 1' in the lower part 1, so that in the unpressurized condition the turn-over membrane 5 bears fully thereagainst.

In operative connection with the turn-over membrane 5 is a fold-over member 7 whose function will be described in greater detail hereinafter.

In the zones of its heaviest transverse movement and maximum mechanical stressing, the turn-over membrane 5 has reinforcements 6, for example, in the form of fabric inserts. The surface contour of the lower clamping ring 1'" corresponds to the contour of the moulding 3 in this zone. The moulding 3 with its covering 4 and the overlap 4' thereof extends freely into the annular space 20, without its being deformed by the turn-over membrane 5 or the fold-over member 7 in the unpressurized starting position of the apparatus.

In the embodiment illustrated, the turn-over membrane 5 can be made of a non-elastic, but adequately flexible material; however, it is also possible, after the fashion of a rubber membrane, to use a correspondingly resilient material for the turn-over membrane; in that case its free length can also be shorter than illustrated. In the radially outer zone, behind the turn-over membrane 5, the lower part 1 is formed with one or more ducts in the form of bores 8 for a liquid or gaseous pressure medium.

If pressure is applied via bores 8, the space bounded by the turn-over membrane 5 with its sealing elements 9 on the one hand, and the contact surface 1' on the other, is filled with the pressure medium, so that the turn-over membrane 5, together with the fold-over member 7, is moved as far as the end position shown in FIG. 2 and at any time also occupies the intermediate position shown in chain lines in FIG. 1.

As can be seen, for the tucking-in and glueing-over of the overlap 4' of the covering 4 of the moulding 3, the fold-over member 7 makes a kind of rocking movement, being guided in co-operation with the turn-over membrane 5 along the contact surfaces 1' and 2', which at the same time determine the maximum possible deformation of the membrane.

The end position (FIG. 2) is characterized in that the fold-over member 7 forces the overlap 4' of the covering 4 completely and with an adequate contact pressure against the rearside of the moulding 3, the turn-over membrane 5 assuming its maximum deflection in the direction of the contact surface 2'.

With adequately flexible and/or resilient materials for the turn-over membrane 5, it is conceivable that the fold-over member 7 can be completely dispensed with, since in that case the turn-over membrane 5 itself is suitable for applying itself firmly enough to the rearside of the moulding 3 in the zone of the overlap 4'. However, for turn-over membranes 5 with relatively thicker walls, and the resulting higher compressive loadability, it is recommended to use the fold-over member 7 illustrated, which by its specific elasticity ensures an additional buffering and therefore homogenization of the pressure for glueing-over, since the compressible, easily deformable material of which the fold-over member 7 is preferably made is able to fill out the hollow section flush. For this purpose the fold-over member 7 can take the form of a simple hollow tube, but it can also comprise a multichamber section or a foam rubber section of low Shore hardness. If required, the fold-over member 7 can also have differential compressibility and differential deformation resistances locally over the length of the peripheral edge. For example, the fold-over member can be formed by a shaped tube which is provided at those places, at which the moulding 3 has sharp corners, with a filling of foam rubber or similar materials, to prevent the material of the tube from kinking at these places.

After the tucking-in and glueing-over of the edge zones of the moulding 3 have been completed, the pressure medium is again removed by suction from the sealed zone of the annular chamber 20 via the bores 8, and the negative pressure restores the starting condition illustrated in FIG. 1, whereafter the two parts 1 and 2 of the apparatus can be separated from one another (i.e., the apparatus can be opened), and the finished glued-over moulding can be removed and a fresh one inserted.

FIGS. 3 and 4 are partial sections extending perpendicularly to the section shown in FIGS. 1 and 2 through the apparatus in the zone of a corner of the moulding 3. As shown, in the corner zone the fold-over member 7, constructed in the form of a shaped tube, is reinforced with an additional buffering 10 in the form of a foam rubber insert; this reliably prevents the aforementioned kinking of the shaped tube when the turn-over membrane 5 is actually turned over, even if sharp-edged corners are involved. Worked into the lower part 1 of the apparatus 1, 2 in the corner zone illustrated is an additional resilient hollow member 11 which can be supplied with a pressure medium via a supply line 12, separately from the pressure supply to the turn-over membrane 5. The unpressurized condition is illustrated in FIG. 3, while FIG. 4 shows the expanded condition of the hollow member 11. FIG. 4 shows how the zone adjoining the turn-over membrane is also forced in the direction of the peripheral edge of the moulding, while the remaining zones of the resilient hollow member 11 are borne and retained tightly in position by the contact surface 1' of the lower part 1 of the apparatus. The force of the pressurized hollow member 11 further deforms the turn-over membrane 5 in the zone of the corner and deforms the fold-over member 7 and pushes the latter and that zone of the overlap 4' of the covering 4 bearing thereagainst over the edge of the moulding 3. Only after completion of the local outward turning of the turn-over membrane 5 in the zone of the hollow member 11 are the remaining zones of the turn-over membrane 5 turned by applying pressure through over the bores 8. The hollow member 11 is returned into its starting position by the release of the pressure medium via the supply line 12, corresponding to the suctional removal process of that zone of the annular space 20 which lies between the contact surface 1' and the turn-over membrane 5 through the bore 8.

I claim:

1. Apparatus for tucking the edge zone of a surface covering over a supporting edge, the apparatus comprising, in combination:
    a pair of support members which respectively include contact surfaces in spaced relationship with each other to define an enlarged opening therebetween;
    means for maintaining a surface covering and a supporting edge between the support members with the edge zone of the surface covering overlapping said edge and extending into the enlarged opening, the edge including at least one corner portion;
    a flexible impermeable turn-over membrane disposed within the enlarged opening in position to move toward and away from the edge zone;
    a deformable fold-over member located within the opening between the turn-over membrane and the edge zone, the fold-over member being formed as a shaped tube and being filled with resilient foam at the locations of said at least one corner portion of the surface covering; and
    means for applying pressure to the turn-over membrane to move the membrane and the associated fold-over member toward the edge zone and thereby urge said edge zone over its supporting edge, the filling of resilient foam serving to prevent the shaped tube of the fold-over member from kinking at the locations of the at least one corner portion.

2. Apparatus as defined in claim 1, in which the turn-over membrane alternately moves into at least partial contact with the respective contact surfaces in response to the pressure applying means.

3. Apparatus as defined in claim 1, in which the pressure applying means comprises means for introducing fluid under pressure into said enlarged opening.

4. Apparatus as defined in claim 1 which further comprises, in combination:
    clamping means for maintaining the turn-over membrane in fluid-tight relationship with one of said support members.

5. Apparatus as defined in claim 11, in which the turn-over membrane is made at least partially of resilient material.

6. Apparatus for tucking the edge zone of a surface covering over a supporting edge, the apparatus comprising, in combination:
    a pair of support members which respectively include contact surfaces in a spaced relationship with each other to define an enlarged opening therebetween;
    means for maintaining a surface covering and a supporting edge between the support members with the edge zone of the surface covering overlapping said edge and extending into the enlarged opening;
    a flexible impermeable turn-over membrane disposed within the enlarged opening in position to move toward and away from the edge zone of the surface covering;
    a fold-over member of deformable cross-section located within the opening between the turn-over membrane and the edge zone of the surface covering; and
    means for applying pressure to the turn-over membrane to move it and to rock the fold-over member toward and over the edge zone and thereby urge said edge zone over its supporting edge, the fold-over member engaging said edge zone during said movement to wrap the edge zone around the supporting edge.

7. Apparatus as defined in claim 6, in which the contact surfaces serve as guide surfaces for the movement of the fold-over member.

8. Apparatus as defined in claim 6, in which the turn-over membrane includes at least one reinforcement at a selected portion thereof.

9. Apparatus for tucking the edge zone of a surface covering over a supporting edge, the apparatus comprising, in combination:
    a pair of support members which respectively include contact surfaces in spaced relationship with each other to define an enlarged opening therebetween;
    means for maintaining a surface covering and a supporting edge between the support members with the edge zone of the surface covering overlapping said edge and extending into the enlarged opening, said edge including at least one corner portion;

a flexible impermeable turn-over membrane disposed within the enlarged opening in position to move toward and away from the edge zone of the surface covering;

a deformable fold-over member located within the opening between the turn-over membrane and the edge zone of the surface covering;

means including a resilient hollow member carried by one of said support members adjacent the corner portion of said edge;

first pressure applying means for applying pressure to the turn-over membrane to move the same toward the edge zone and thereby urge said zone over its supporting edge, the fold-over member engaging said edge zone during said movement to wrap the edge zone around said supporting edge; and second pressure applying means for applying pressure to the resilient hollow member to urge said hollow member toward said turn-over membrane in the vicinity of said corner portion.

10. Apparatus as defined in claim 9, in which said first and second pressure applying means are independently operable to selectively apply positive and negative pressure to the turn-over membrane and the resilient hollow member.

11. Apparatus as defined in claim 9, in which the cross-sectional shape of the fold-over member conforms at least approximately to portions of said contact surfaces.

12. Apparatus as defined in claim 1, which further comprises a resilient hollow member carried by one of said support members adjacent the at least one corner portion of said edge; and pressure applying means for applying pressure to the resilient hollow member to urge said hollow member toward said turn-over membrane in the vicinity of said at least one corner portion.

13. Apparatus as defined in claim 6, in which the fold-over member is formed of a hollow tube disposed along said edge zone.

14. Apparatus as defined in claim 13, in which said hollow tube has portions filled with compressible foam material, so as to achieve differential compressibility and differential deformation resistances along its length.

15. Apparatus as defined in claim 12, in which the reinforcement for the turn-over membrane includes a fabric insert.

16. Apparatus as defined in claim 6, in which the cross-sectional shape of the fold-over member conforms at least approximately to corresponding portions of the shape defined by the contact surfaces of the mating pair of support members.

* * * * *